(12) United States Patent
Yu et al.

(10) Patent No.: US 12,025,157 B1
(45) Date of Patent: Jul. 2, 2024

(54) COMPRESSED-AIR ENERGY STORAGE SYSTEM AND METHOD OF CONSTANT-PRESSURE FULL-CAPACITY ENERGY-RELEASE TYPE

(71) Applicant: Xi'an Thermal Power Research Institute Co., Ltd, Xi'an (CN)

(72) Inventors: Zaisong Yu, Xi'an (CN); Hongzhe Wang, Xi'an (CN); Wei Han, Xi'an (CN); Yang Li, Xi'an (CN); Haimin Ji, Xi'an (CN); Hanchen Zhao, Xi'an (CN); Liang Zhao, Xi'an (CN)

(73) Assignee: Xi'an Thermal Power Research Institute Co., Ltd, Xi'an (CN)

( * ) Notice: Subject to any disclaimer, the term of this patent is extended or adjusted under 35 U.S.C. 154(b) by 0 days.

(21) Appl. No.: 18/499,686

(22) Filed: Nov. 1, 2023

(30) Foreign Application Priority Data

Feb. 13, 2023 (CN) .......................... 202310103565.1

(51) Int. Cl.
*F15B 1/02* (2006.01)
*F15B 1/027* (2006.01)
(Continued)

(52) U.S. Cl.
CPC .............. *F15B 1/022* (2013.01); *F15B 1/024* (2013.01); *F15B 1/027* (2013.01); *F15B 1/04* (2013.01); *H02J 15/006* (2013.01); *Y02E 60/16* (2013.01)

(58) Field of Classification Search
CPC .......... H02J 15/006; F02C 6/16; Y02E 60/16; Y02E 70/30
See application file for complete search history.

(56) References Cited

U.S. PATENT DOCUMENTS 7,281,371 B1 * 10/2007 Heidenreich ........... F03B 13/06
60/398
10,837,360 B2 * 11/2020 Maier .................... H02J 15/003
(Continued)

FOREIGN PATENT DOCUMENTS

CN 104121049 A 10/2014
CN 105863752 A 8/2016
(Continued)

OTHER PUBLICATIONS

OA for CN application 202310103565.1.
(Continued)

*Primary Examiner* — Michael Leslie
(74) *Attorney, Agent, or Firm* — Maginot, Moore & Beck, LLP

(57) ABSTRACT

A compressed-air energy storage system of a constant-pressure full-capacity energy-release type, includes two or more liquid-gas coexisting containers, at least one of the two or more liquid-gas coexisting containers is filled with a pressurized liquid, the rest liquid-gas coexisting containers are configured to store a high-pressure air, and the two or more liquid-gas coexisting containers are in communication with each other. When the compressed-air energy storage system of the constant-pressure full-capacity energy-release type operates in an energy storage operating condition, the high-pressure air can be directly stored in the liquid-gas coexisting container without energy conversion loss. When the compressed-air energy storage system operates in an energy release operating condition, the pressurized liquid circulates in the liquid-gas coexisting containers storing the high-pressure air, to realize a constant-pressure full-capacity release of the high-pressure air.

7 Claims, 4 Drawing Sheets

(51) Int. Cl.
  *F15B 1/04*    (2006.01)
  *H02J 15/00*   (2006.01)

(56) References Cited

U.S. PATENT DOCUMENTS

| | | | | |
|---|---|---|---|---|
| 11,081,904 | B1* | 8/2021 | Barhoumi | F17C 7/00 |
| 11,532,949 | B2* | 12/2022 | Yogev | F15B 1/04 |
| 2014/0091574 | A1* | 4/2014 | Favy | F02C 6/16 |
| | | | | 137/209 |
| 2016/0130986 | A1* | 5/2016 | Campos | F15B 1/024 |
| | | | | 60/416 |
| 2023/0175472 | A1* | 6/2023 | Tauscher | F03B 13/06 |
| | | | | 290/54 |

FOREIGN PATENT DOCUMENTS

| | | |
|---|---|---|
| CN | 106089657 A | 11/2016 |
| CN | 107780989 A | 3/2018 |
| CN | 108930627 A | 12/2018 |
| CN | 110506153 A | 11/2019 |
| CN | 114382561 A | 4/2022 |
| CN | 115788745 A | 3/2023 |
| JP | H9-163640 A | 6/1997 |
| WO | 2013/093135 A1 | 6/2013 |
| WO | 2022/168096 A1 | 8/2022 |

OTHER PUBLICATIONS

English translation of OA for CN application 202310103565.1.
Notice of Allowance for CN application 202310103565.1.
English translation of Notice of Allowance for CN application 202310103565.1.
Double-tank compressed air energy storage system and its thermodynamic analysis.

* cited by examiner

COMPRESSED-AIR ENERGY STORAGE SYSTEM AND METHOD OF CONSTANT-PRESSURE FULL-CAPACITY ENERGY-RELEASE TYPE

CROSS-REFERENCE TO RELATED APPLICATION

This application is based on and claims priority to Chinese Patent Application No. 202310103565.1 filed on Feb. 13, 2023, the entire contents of which are incorporated herein by reference for all purposes.

FIELD

The present disclosure relates to a field of storage, and more particularly to a compressed-air energy storage system and method of a constant-pressure full-capacity energy-release type.

BACKGROUND

With the large-scale utilization of new energies, the energy storage has become an indispensable link in the global energy transformation process, especially in large-scale new energy bases and other scenarios, which need the support of large-scale, long-term, efficient and low-cost energy storage technologies. Among many energy storage technologies, it is generally considered that the compressed-air energy storage system is one of the most competitive large-scale electric energy storage technology routes.

The relevant compressed-air energy storage technologies may be divided into two types, namely the constant-pressure energy storage and the variable-pressure (or constant-volume) energy storage. The main difference between the constant-pressure energy storage and the variable-pressure energy storage (or constant-volume) is that the former can keep the air pressure in the gas storage chamber unchanged during operation, and improve the energy conversion efficiency and the power output quality of the energy storage system while maintaining the stability of the gas storage chamber. Therefore, the constant-pressure energy storage is an ideal mode for the construction of the compressed-air energy storage power station. However, in order to ensure the constant-pressure output of the compressed-air energy storage system, it is necessary to adopt a hydrostatic pressure system for the constant pressure, such as the constant pressure at the bottom of the sea and the constant pressure at the underground storage reservoir, which not only puts strict requirements on the geological conditions of the site where the project is located, but also greatly increases the construction investment cost of the system, thus resulting in poor operation economy. For example, CN114718684A discloses a gravity hydraulic compressed-air energy storage system and method, the system includes a gas storage, a hydraulic well, a hydraulic pipeline and a hydraulic bypass, the gas storage is filled with a pressurized liquid, a gravity pressing block is movably inserted in the hydraulic well, and a sealing film is hermetically connected between an outer wall of the gravity pressing block and an inner wall of the hydraulic well. The gravity pressing block, the sealing film and the space below the gravity pressing block and the sealing film in the hydraulic well enclose a liquid storage cavity. A liquid input end and a liquid output end of the hydraulic pipeline are respectively connected with the gas storage and the liquid storage cavity, and the hydraulic pipeline is provided with a high-pressure water pump. A liquid input end and a liquid output end of the hydraulic bypass are respectively connected with the liquid storage cavity and the gas storage. In the above related art, when the energy storage system operates in an energy storage operating condition, a high-pressure air is filled into the gas storage by the compressor, and the high-pressure air and the high-pressure water pump discharge the hydraulic liquid into the hydraulic well together to lift the gravity pressing block. When the energy storage system operates in an energy release operating condition, a water turbine and an expander unit drive a generator to generate electricity at the same time. The huge gravity scale required by the hydraulic well leads to the huge investment in the construction of the energy storage system. In addition, when the energy storage system operates, the volume of the pressurized liquid required is also large, thus resulting in a huge waste of water resources. The gas storage also needs a large volume to hold both the pressurized liquid and the high-pressure air at the same time, which further increases the construction investment cost. Therefore, the energy storage system in the related art has a poor engineering practicability and a low operation economy.

However, if the energy storage system operates in a variable-pressure mode, for example an energy release pressure gradually decreases, the energy storage system will be forced to adopt a throttling constant-pressure mode or a sliding pressure operation mode, which will lead to a low energy storage efficiency. However, when the energy storage system operates at a lower pressure, the overall utilization rate of the compressed air in the gas storage chamber is low, and it is impossible to release all the compressed air to do work. Moreover, in order to ensure the energy release effect of the energy storage system, it is necessary to expand the building scale of the gas storage chamber, which increases the investment cost of the project, and restricts the popularization and application of the large-scale compressed-air energy storage technology. Therefore, it is an urgent technical problem to provide a compressed-air energy storage system and method of a constant-pressure full-capacity energy-release type, which can enhance the engineering practicability of the compressed-air energy storage system under the condition of ensuring the energy storage efficiency, and also can reduce the construction scale of the compressed-air energy storage system so as to reduce the investment cost, improve the operation economy of the energy storage system, and finally achieve the constant-pressure full-capacity release of the compressed air.

SUMMARY

Embodiments of a first aspect of the present disclosure provide a compressed-air energy storage system of a constant-pressure full-capacity energy-release type. The system includes: two or more liquid-gas coexisting containers, in which at least one of the two or more liquid-gas coexisting containers is filled with a pressurized liquid, the rest liquid-gas coexisting containers are configured to store a high-pressure air, and the two or more liquid-gas coexisting containers are in communication with each other; a compressor unit connected to a gas port of each liquid-gas coexisting container and configured to introduce the high-pressure air into the liquid-gas coexisting container configured to store the high-pressure air; and an expander unit connected to the gas port of each liquid-gas coexisting container, to allow the high-pressure air stored in the liquid-gas coexisting container to be introduced into the expander unit to do work and generate electricity.

Embodiments of a second aspect of the present disclosure provide a compressed-air energy storage method of a constant-pressure full-capacity energy-release type. The method adopts a compressed-air energy storage system of a constant-pressure full-capacity energy-release type. The compressed-air energy storage system includes: two or more liquid-gas coexisting containers, in which at least one of the two or more liquid-gas coexisting containers is filled with a pressurized liquid, the rest liquid-gas coexisting containers are configured to store a high-pressure air, and the two or more liquid-gas coexisting containers are in communication with each other; a compressor unit connected to a gas port of each liquid-gas coexisting container and configured to introduce the high-pressure air into the liquid-gas coexisting container configured to store the high-pressure air; and an expander unit connected to the gas port of each liquid-gas coexisting container, to allow the high-pressure air stored in the liquid-gas coexisting container to be introduced into the expander unit to do work and generate electricity.

Additional aspects and advantages of the present disclosure will be given in part in the following descriptions, and will become apparent in part from the following descriptions, or be learned from the practice of the present disclosure.

BRIEF DESCRIPTION OF THE DRAWINGS

The above and/or additional aspects and advantages of the present disclosure will become apparent and readily appreciated from the following descriptions of embodiments made with reference to the drawings, in which.

DETAILED DESCRIPTION

Figure 1:
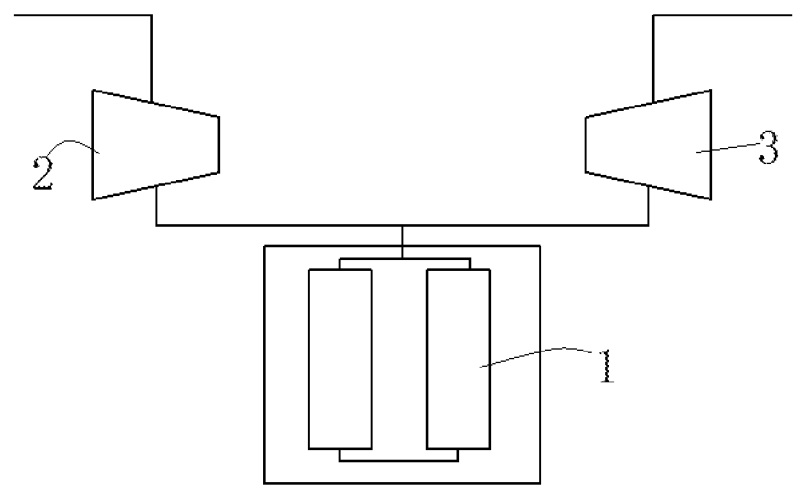
FIG. 1 is a schematic view of a compressed-air energy storage system according to an embodiment of the present disclosure.

Embodiments of the present disclosure will be described below in detail, examples of which are shown in the accompanying drawings, in which the same or similar reference numerals indicate the same or similar elements or elements with the same or similar functions throughout. The embodiments described below by referring to the accompanying drawings are illustrative, only for explaining the present disclosure, and cannot be understood as limitations to the present disclosure. On the contrary, the embodiments of the present disclosure include all changes, modifications and equivalents which fall within the spirit and connotation scopes of the appended claims.

FIG. 1 is a schematic view of a compressed-air energy storage system 1000 according to an embodiment of the present disclosure. According to a first aspect of the present disclosure, a compressed-air energy storage system 1000 of a constant-pressure full-capacity energy-release type is proposed. As shown in FIG. 1, the compressed-air energy storage system 1000 includes two or more liquid-gas coexisting containers 1 in communication with each other, a compressor unit 2 and an expander unit 3. At least one of the two or more liquid-gas coexisting containers 1 in communication with each other is filled with a pressurized liquid, and the rest liquid-gas coexisting containers 1 are used for storing a high-pressure air. It may be understood that the liquid-gas coexisting container 1 is a sealed container made of profiles and having a certain holding volume, which has a strong support force and leakproofness, and may be used for the adiabatic storage of liquid and gas.

Figure 4:
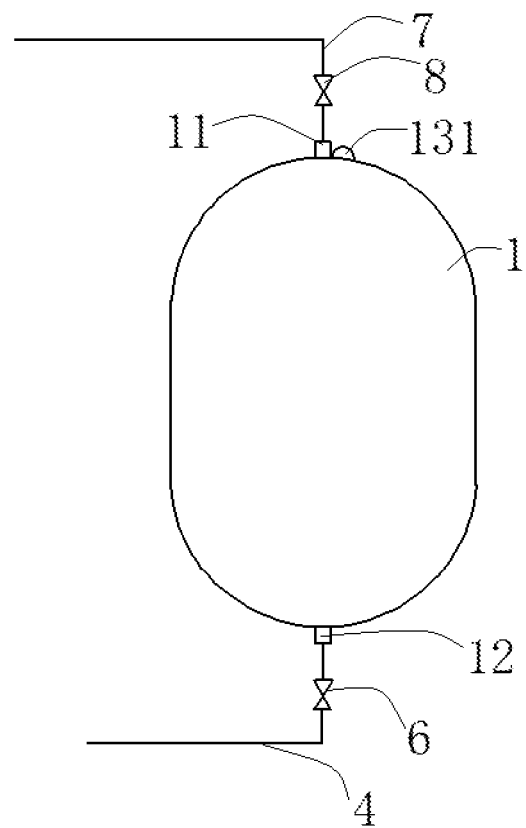
FIG. 4 is a schematic view of a liquid-gas coexisting container according to an embodiment of the present disclosure.
Figure 5:
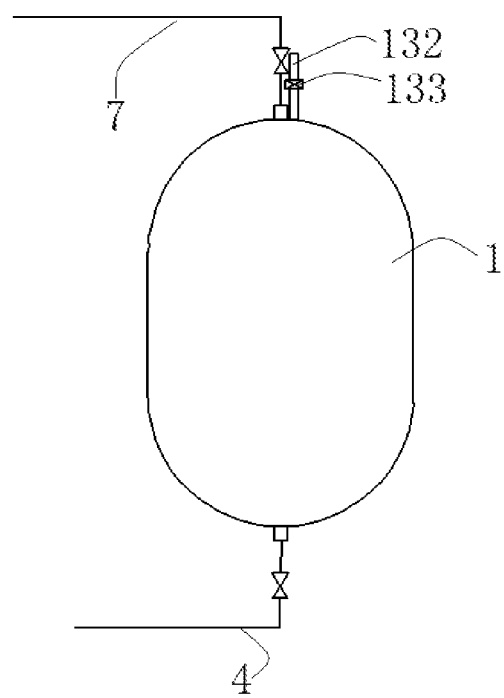
FIG. 5 is a schematic view of a liquid-gas coexisting container according to another embodiment of the present disclosure.

For example, two or more liquid-gas coexisting containers 1 may be provided and communicated with each other. In other words, the liquid-gas coexisting container 1 has a gas port 11 for input and output of the high-pressure air and a liquid port 12 for input and output of the pressurized liquid, as shown in FIGS. 4 and 5. At least one liquid-gas coexisting container 1 is filled with the pressurized liquid, and the pressurized liquid may circulate among the liquid-gas coexisting containers 1. As shown in FIG. 1, two liquid-gas coexisting containers 1 may be provided, one liquid-gas coexisting container 1 stores the high-pressure air, and the other liquid-gas coexisting container 1 is filled with the pressurized liquid. That is, at least one liquid-gas coexisting container 1 is filled with the pressurized liquid. The liquid-gas coexisting container 1 has the gas port 11 and the liquid port 12. The liquid port 12 may be arranged at a bottom of the liquid-gas coexisting container 1, and the gas port 11 may be arranged at a top of the liquid-gas coexisting container 1 according to the circulation characteristics of the high-pressure air and the pressurized liquid.

It should be noted that the arrangement of the liquid-gas coexisting containers 1 in the embodiments of the present disclosure may be adapted to local conditions. For example, all the liquid-gas coexisting containers 1 may be arranged in a centralized manner, when there is a large space and an excellent geological condition at a construction site. However, when the geological condition of the construction site is not suitable, the liquid-gas coexisting containers 1 may be modularized and dispersed, so as to expand the universality of the compressed-air energy storage system 1000 of the constant-pressure full-capacity energy-release type and also to facilitate the popularization and application of the compressed-air energy storage system 1000 of the constant-pressure full-capacity energy-release type.

Figure 2:
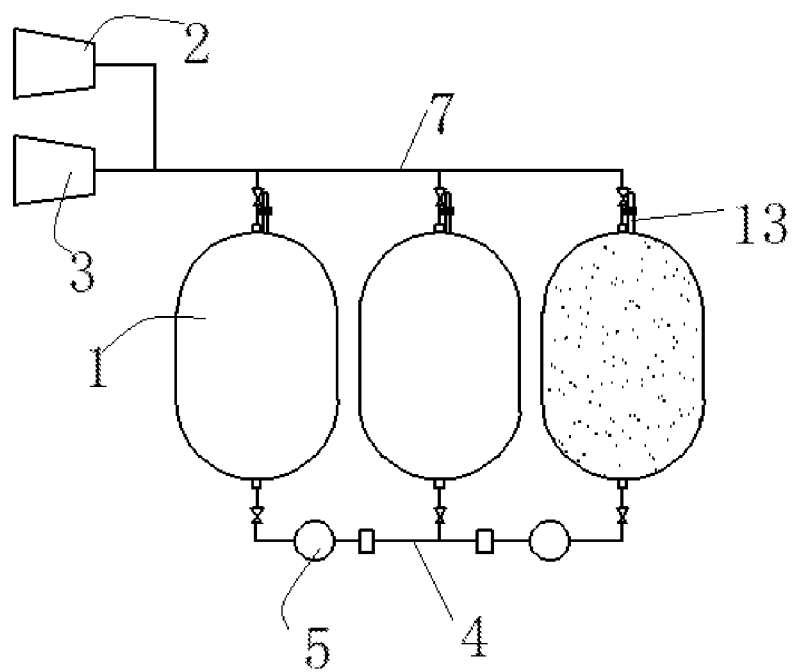
FIG. 2 is a schematic view illustrating distribution and connection of a liquid-gas coexisting container according to an embodiment of the present disclosure.
Figure 3:
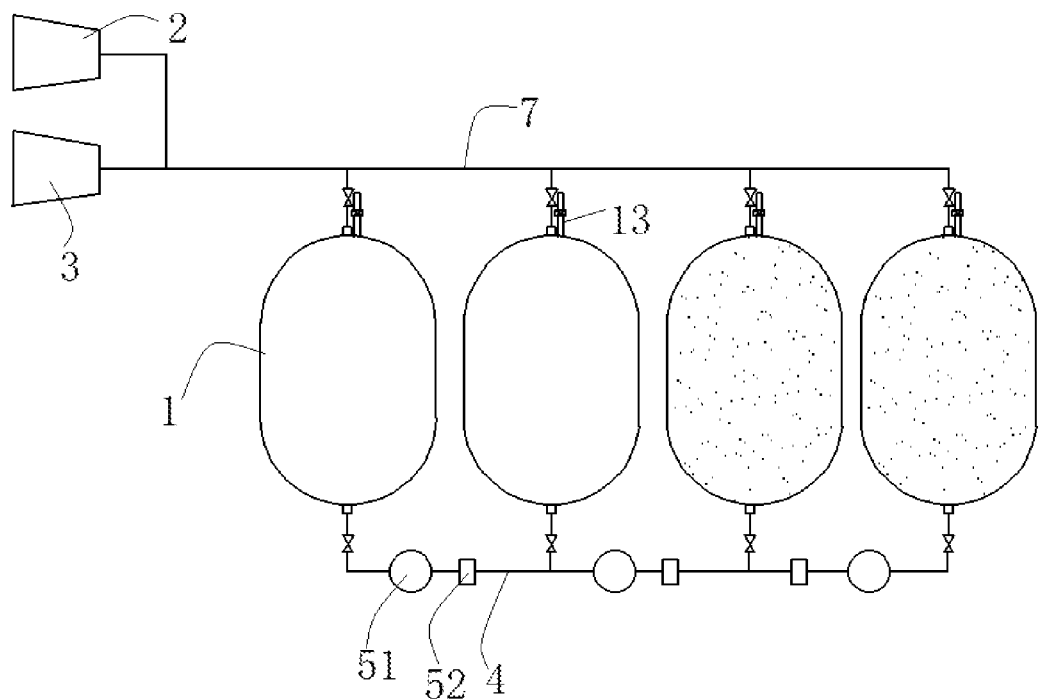
FIG. 3 is a schematic view illustrating distribution and connection of a liquid-gas coexisting container according to another embodiment of the present disclosure.

In the embodiments of the present disclosure, the compressor unit 2 is connected to the gas port 11 of the liquid-gas coexisting container 1 for introducing the high-pressure air into the liquid-gas coexisting container 1, and the expander unit 3 is also connected to the gas port 11 of the liquid-gas coexisting container 1, so that the high-pressure air stored in the liquid-gas coexisting container 1 can flow into the expander unit 3 to do work and generate electricity, as shown in FIGS. 2 and 3. The compressor unit 2 and the expander unit 3 are both conventional arrangements in the related art, so they are not repeated here.

Therefore, in the embodiments of the present disclosure, the compressed-air energy storage system 1000 of the constant-pressure full-capacity energy-release type has a simple structure, is easy to realize and has a low cost. In a stage of an energy storage operating condition, the compressor unit 2 only needs to compress an air to generate the high-pressure air and send the high-pressure air into the liquid-gas coexisting container 1 without storing the pressurized liquid, thus realizing a direct storage of the high-pressure air without an energy conversion loss. In a stage of an energy release operating condition, a small amount of the pressurized liquid is input into the liquid-gas coexisting container 1 storing the high-pressure air, to output the stored high-pressure air to the expander unit 3 to push the expander unit 3 to do work. Therefore, the present disclosure can circulate a small amount of the pressurized liquid in a plurality of liquid-gas coexisting containers which are communicated with each other, to realize a convenient, efficient and stable constant-pressure full-capacity output of the high-pressure air stored in the liquid-gas coexisting containers, so that the full utilization of the high-pressure air can be achieved with the reduction of the compressed air capacity by more than 40% compared with that in the related art. In addition, by circulating the pressurized liquid in the plurality of liquid-gas coexisting containers 1, the pressurized liquid reserve can be reduced by more than 90% compared with that in the related art. This greatly optimizes the construction scale and the investment cost of the artificial liquid-gas coexisting container 1 compressing the air to store energy, and promotes the economic feasibility of the large-scale compressed air energy storage technology.

In some embodiments, the liquid-gas coexisting container 1 is provided with a pressure balancing member 13 in communication with the liquid-gas coexisting container 1. The pressure balancing member 13 is used to balance air pressures inside and outside the liquid-gas coexisting container 1 when the pressurized liquid in the liquid-gas coexisting container 1 flows out.

The pressure balancing member 13 is arranged on the liquid-gas coexisting container 1, and is communicated with the liquid-gas coexisting container 1, for balancing the air pressures inside and outside the liquid-gas coexisting container 1. It may be understood that when the liquid-gas coexisting container 1 is filled with the pressurized liquid, in order to realize the smooth outflow of the pressurized liquid and to prevent the structural damage to the liquid-gas coexisting container 1 while the pressurized liquid is circulated and transferred, the pressure balancing member 13 for balancing the pressures inside and outside the liquid-gas coexisting container 1 may be arranged to the liquid-gas coexisting container 1. When the pressures inside and outside the liquid-gas coexisting container 1 are the same, the pressurized liquid in the liquid-gas coexisting container 1 can be transferred smoothly.

For example, as shown in FIG. 4, by arranging a ventilating hole 131 on the liquid-gas coexisting container 1, it is achieved that the pressures inside and outside the liquid-gas coexisting container 1 are the same. However, in some embodiments as shown in FIG. 5, in order to ensure the storage leakproofness of the liquid-gas coexisting container 1, the pressure balancing member 13 includes a communicating pipe 132. The communicating pipe 132 is a pipeline structure with two open ends, and is integrally formed with the liquid-gas coexisting container 1. One end of the communicating pipe 132 is fixed to the top of the liquid-gas coexisting container 1, and the other end of the communicating pipe 132 is provided with a communicating valve 133, which may be closed or opened according to the operating condition of the compressed-air energy storage system 1000 of the constant-pressure full-capacity energy-release type. When the communicating valve 133 is closed, the sealing of the liquid-gas coexisting container 1 is realized. When the communicating valve 133 is opened, the balance of the air pressures inside and outside the liquid-gas coexisting container 1 is realized.

In some embodiments, the liquid ports 12 of the liquid-gas coexisting containers 1 are communicated with each other by a hydraulic pipeline 4, the hydraulic pipeline 4 is provided with a plurality of liquid pump assemblies 5 and a plurality of liquid valves 6, the liquid pump assembly 5 is arranged between each adjacent two liquid-gas coexisting containers 1, and the liquid valve 6 is arranged at the liquid port 12 of each liquid-gas coexisting container 1.

In the embodiments of the present disclosure, the liquid ports 12 of the respective liquid-gas coexisting containers 1 are communicated with each other by the hydraulic pipeline 4, as shown in FIGS. 4 and 5. The hydraulic pipeline 4 has a claw-like structure and includes a main channel and a plurality of branch channels. Both ends of each branch channel are communicated with the main channel and the liquid port 12 of the liquid-gas coexisting container 1, respectively. In the embodiments of the present disclosure, the liquid valve 6 and the branch channel are used in pairs, that is, one liquid valve 6 is correspondingly arranged in one branch channel to control the flow of the branch channel and whether the branch channel is unclosed or closed. The liquid pump assembly 5 is arranged in the main channel between adjacent branch channels, used to pump the pressurized liquid in the liquid-gas coexisting container 1, and also cooperates with the liquid valve 6 on the branch channel to realize the circulation and transfer of the pressurized liquid in different liquid-gas coexisting containers 1. For example, the liquid pump assembly 5 includes a liquid pump 51 and a control valve 52 connected with the liquid pump 51, and the control valve 52 is located upstream of the liquid pump 51 according to a circulation direction of the pressurized liquid. It may be understood that the liquid pump 51 may provide a conveying force for transferring the pressurized liquid in the liquid-gas coexisting container 1, and the control valve 52 may control the flow of the pressurized liquid flowing through the main channel. The flow of the pressurized liquid may be zero.

In some embodiments, the gas ports 11 of the liquid-gas coexisting container 1 are communicated with each other by a pneumatic pipeline 7, a plurality of gas valves 8 are arranged on the pneumatic pipeline 7, and each gas valve 8 is correspondingly arranged at the gas port 11.

In the embodiments of the present disclosure, the gas ports 11 of the respective liquid-gas coexisting containers 1 are communicated with each other by the pneumatic pipeline 7, as shown in FIGS. 3-5. For example, the pneumatic pipeline 7 may have a claw-shaped structure, and include a main channel and a plurality of branch channels. The gas valve 8 and the branch channel are used in pairs. That is, one gas valve 8 is correspondingly arranged in one branch channel to control the flow of the high-pressure air in the branch channel. The flow of the high-pressure air may be 0. For example, in different operating conditions of the compressed-air energy storage system 1000 of the constant-pressure full-capacity energy-release type, the gas valve 8 may opened or closed as follows: when the compressed-air energy storage system 1000 is in the stage of the energy storage operating condition, the gas valves 8 of the liquid-gas coexisting containers 1 storing the pressurized liquid are all closed, and the gas valves 8 of the rest liquid-gas coexisting containers 1 are all opened; when the compressed-air energy storage system 1000 is in the stage of the energy release operating condition, the gas valve 8 of the liquid-gas coexisting container 1 receiving the pressurized liquid is opened, and the gas valves 8 of the rest liquid-gas coexisting containers 1 are all closed.

Figure 6:
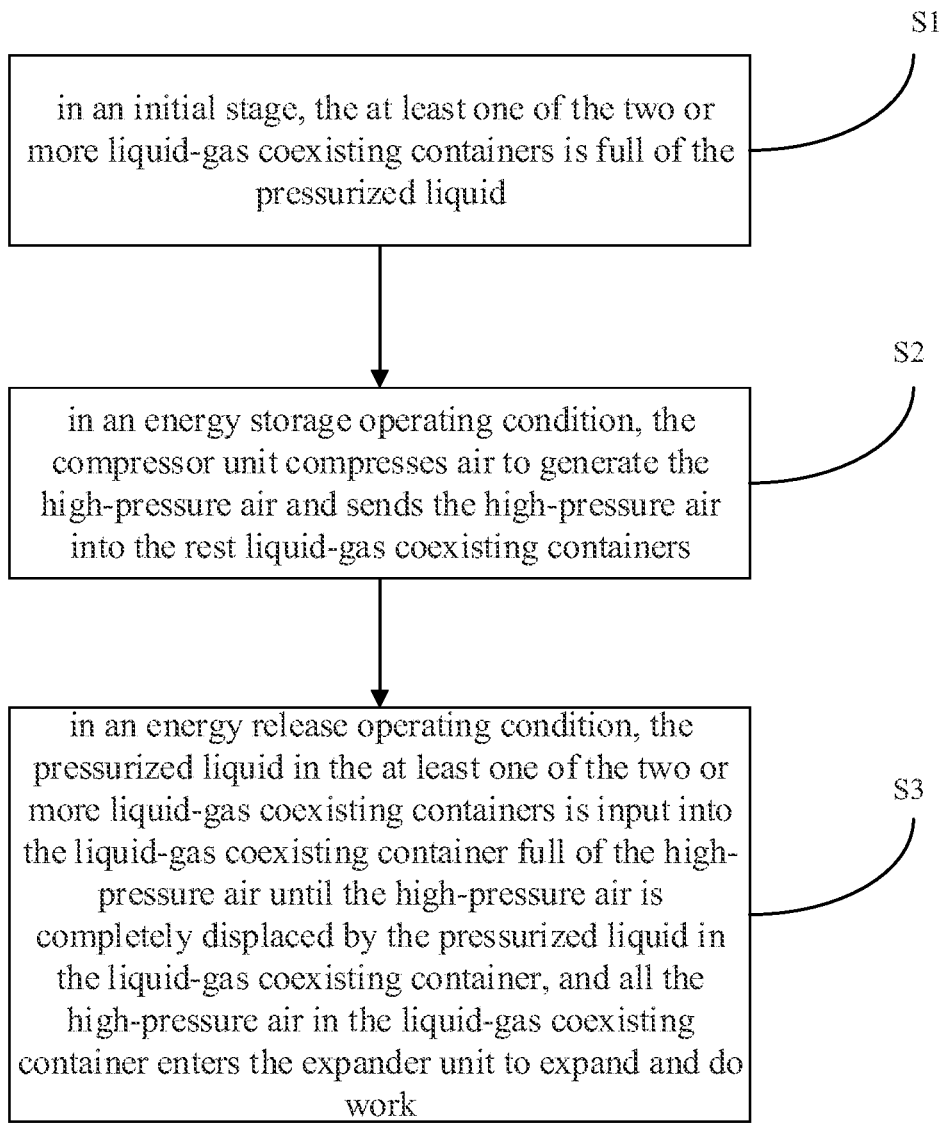
FIG. 6 is a flow chart of a compressed-air energy storage method of a constant-pressure full-capacity energy-release type according to an embodiment of the present disclosure.

According to a second aspect of the present disclosure, a compressed-air energy storage method of a constant-pressure full-capacity energy-release type is proposed, as shown in FIG. 6. This method uses the compressed-air energy storage system 1000 of the constant-pressure full-capacity energy-release type in any one of the above embodiments to store energy. The method includes the following steps. At step S1, at least one liquid-gas coexisting container 1 is filled with the pressurized liquid in an initial stage. At step S2, in an energy storage operating condition, the compressor unit 2 compresses the air to generate the high-pressure air and sends the high-pressure air into the liquid-gas coexisting container 1 without storing the pressurized liquid. At step S3, in an energy release operating condition, the pressurized liquid in the at least one liquid-gas coexisting container 1 is input into the liquid-gas coexisting container 1 filled with the high-pressure air until the high-pressure air is completely displaced by the pressurized liquid in the liquid-gas coexisting container 1. At the same time, all the high-pressure air in the liquid-gas coexisting container 1 enters the expander unit 3 to push the expander unit 3 to do work.

That the at least one liquid-gas coexisting container 1 is filled with the pressurized liquid may be understood as that one, two or more liquid-gas coexisting containers 1 are filled with the pressurized liquid. Since the compressed-air energy storage system 1000 of the constant-pressure full-capacity energy-release type in the embodiments of the present disclosure is mainly used for storing the high-pressure air to realize the energy storage, it is necessary to ensure that more liquid-gas coexisting containers 1 are used for storing the high-pressure air in applications. Thus, it is not suitable for more liquid-gas coexisting containers 1 to store the pressurized liquid, while the remaining liquid-gas coexisting containers 1 without the pressurized liquid are used to store the high-pressure air.

For example, as shown in FIG. 2, three liquid-gas coexisting containers 1 are provided. For convenience of description, the three liquid-gas coexisting containers 1 are sequentially numbered as a first liquid-gas coexisting container, a second liquid-gas coexisting container and a third liquid-gas coexisting container from right to left in FIG. 2. In the initial stage, the first liquid-gas coexisting container 1 stores the pressurized liquid, while the second liquid-gas coexisting container 1 and the third liquid-gas coexisting container are empty for storing the high-pressure air. In the energy storage operating condition, the gas valves 8 of the second and third liquid-gas coexisting containers 1 is opened, the gas valve 8 of the first liquid-gas coexisting container 1 is kept closed, while the liquid valves 6 and the communicating valves 133 of the first, second and third liquid-gas coexisting containers 1 are kept closed, so that the compressor unit 2 compresses the air to generate the high-pressure air and sends the high-pressure air into the second and third liquid-gas coexisting containers 1.

In the energy release operating condition, the liquid valve 6 and the communicating valve 133 of the first liquid-gas coexisting container 1 are opened, the liquid valve 6 and the gas valve 8 of the second liquid-gas coexisting container 1 are opened, and the liquid pump 51 and the control valve 52 between the first and second liquid-gas coexisting containers 1 are opened, so that the pressurized liquid in the first liquid-gas coexisting container 1 is gradually transferred to the second liquid-gas coexisting container 1. At the same time, the high-pressure air in the second liquid-gas coexisting container 1 enters the expander unit 3 to push the expander unit 3 to do work until the second liquid-gas coexisting container 1 is filled with the pressurized liquid. This process cycles, so that all the pressurized liquid in the second liquid-gas coexisting container 1 is gradually transferred to the third liquid-gas coexisting container 1, and finally a small amount of the pressurized liquid can be circulated in a plurality of liquid-gas coexisting containers 1 to realize the constant-pressure full-capacity release of the stored high-pressure air, which significantly reduces the supply of potential energy resources.

The embodiments of the present disclosure are illustrated by means of a following example. In the related art, the pressure in the gas storage chamber of the 100 MW×10 h compressed-air energy storage system 1000 is reduced from 10 Mpa to 7 Mpa during the sliding pressure operation, which requires the gas storage capacity of about 300,000 cubic meters. With the same electricity-generation power, the liquid-gas coexisting container 1 in the embodiments of the present disclosure only needs the gas storage capacity of about 100,000 cubic meters. Assuming that the capacity of the liquid-gas coexisting container 1 is 1000 cubic meters, 100 liquid-gas coexisting containers 1 for containing the high-pressure air are needed and 1-5 liquid-gas coexisting containers 1 with the capacity of 1000 cubic meters for containing the pressurized liquid are allocated, which can reduce the compressed air capacity by more than 40%. Moreover, through the circulation application of the pressurized liquid, the pressurized liquid reserve is reduced by more than 90% compared with that in the related art. The construction scale and the investment cost of the compressed-air energy storage of the artificial liquid-gas coexisting container 1 and the pressurized liquid reserve are significantly saved, which greatly promotes the economic feasibility of the large-scale compressed-air energy storage technology, and the energy loss of the whole compressed-air energy storage system 1000 of the constant-pressure full-capacity energy-release type is only the loss of the liquid pump 51 conveying the pressurized liquid.

Typically, two liquid-gas coexisting containers 1 are filled with the pressurized liquid. As shown in FIG. 3, four liquid-gas coexisting containers 1 are arranged for convenience of description, which are sequentially numbered as a first liquid-gas coexisting container 1, a second liquid-gas coexisting container 1, a third liquid-gas coexisting container 1 and a fourth liquid-gas coexisting container 1 from right to left in FIG. 3. The first and second liquid-gas coexisting containers 1 are filled with the pressurized liquid, and the third and fourth liquid-gas coexisting containers 1 are used for storing the high-pressure air. In the energy storage operating condition, the gas valves 8 of the third and fourth liquid-gas coexisting containers 1 is opened, the gas valves 8 of the first and second liquid-gas coexisting containers 1 is kept closed, while the liquid valves 6 and the communicating valves 133 of the first, second, third and fourth liquid-gas coexisting containers 1 are kept closed, so that the compressor unit 2 compresses the air to generate the high-pressure air and sends the high-pressure air into the third and fourth liquid-gas coexisting containers 1.

In the energy release operating condition of the compressed-air energy storage system 1000 according to the embodiments of the present disclosure, the liquid valves 6 and the communicating valves 133 of the first and second liquid-gas coexisting containers 1 are opened, and also the liquid valves 6 and the gas valves 8 of the third and fourth liquid-gas coexisting containers 1 as well as the liquid pumps 51 and the control valves 52 between all the liquid-gas coexisting containers 1 are opened, so that all the pressurized liquid in the first and second liquid-gas coexisting containers 1 is gradually transferred into the third and fourth liquid-gas coexisting containers 1. At the same time, all the high-pressure air in the third and fourth liquid-gas coexisting containers 1 enters the expander unit 3 to push the expander unit 3 to do work. This is suitable for the case that a large amount of the high-pressure air needs to be released to do work in a short time.

Therefore, in the energy storage operating condition of the compressed-air energy storage system 1000 of the constant-pressure full-capacity energy-release type according to the embodiments of the present disclosure, the high-pressure air can be directly stored in the liquid-gas coexisting container without the energy conversion loss. In the energy release operating condition of the compressed-air energy storage system 1000, the pressurized liquid is circulated in the liquid-gas coexisting containers communicated with each other. The constant-pressure full-capacity release of the high-pressure air in the liquid-gas coexisting containers for storing the high-pressure air is realized, so that the supply of potential energy resources can be significantly reduced by circulating a small amount of the pressured liquid among the liquid-gas coexisting containers.

It should be noted that, terms such as "first" and "second" are used herein for purposes of description and are not intended to indicate or imply relative importance or significance. In the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions. This should be understood by those skilled in the art to which the embodiments of the present disclosure belong.

In the present disclosure, the terms "one embodiment", "some embodiments", "examples", "specific examples" or "some examples" etc. mean that the specific features, structures, materials or characteristics described in connection with this embodiment or example are included in at least one embodiment or example of the present disclosure. In this specification, the schematic expressions of the above terms are not necessarily aimed at the same embodiment or example. Moreover, the specific features, structures, materials or characteristics described may be combined in any one or more embodiments or examples in a suitable manner. In addition, those skilled in the art can combine and group different embodiments or examples and features of different embodiments or examples described in this specification without mutual contradiction.

Although the above embodiments have been shown and described, it would be understood that the above embodiments are illustrative and cannot be construed to limit the present disclosure, and changes, modifications, alternatives, and variants of the above embodiments made by those ordinary skilled in the art fall within the scope of protection of the present disclosure.

The invention claimed is:

1. A compressed-air energy storage system, comprising:
two or more liquid-gas coexisting containers, wherein at least one of the two or more liquid-gas coexisting containers is filled with a pressurized liquid, the rest liquid-gas coexisting containers are configured to store a high-pressure air, and the two or more liquid-gas coexisting containers are in communication with each other;
a compressor unit connected to a gas port of each liquid-gas coexisting container and configured to introduce the high-pressure air into the liquid-gas coexisting container configured to store the high-pressure air; and
an expander unit connected to the gas port of each liquid-gas coexisting container, to allow the high-pressure air stored in the liquid-gas coexisting container to be introduced into the expander unit to do work and generate electricity,
wherein the at least one of the two or more liquid-gas coexisting containers is configured to be filled with the pressurized liquid in an initial stage;
the compressor unit is configured to compress air to generate the high-pressure air and send the high-pressure air into the rest liquid-gas coexisting containers in an energy storage operating condition; and
the compressed-air energy storage system is configured to allow the pressurized liquid in the at least one of the two or more liquid-gas coexisting containers to be input into the liquid-gas coexisting container filled with the high-pressure air until the high-pressure air is completely displaced by the pressurized liquid in the liquid-gas coexisting container, and further to allow all the high-pressure air in the liquid-gas coexisting container to enter the expander unit to expand and do work, in an energy release operating condition,
wherein each liquid-gas coexisting container is provided with a pressure balancing member in communication with the liquid-gas coexisting container, and the pressure balancing member is configured to balance air pressures inside and outside the liquid-gas coexisting container when the pressurized liquid in the at least one of the two or more the liquid-gas coexisting containers flows out.

2. The compressed-air energy storage system according to claim 1, wherein the pressure balancing member comprises a communicating pipe, an end of the communicating pipe is connected with the liquid-gas coexisting container, another end of the communicating pipe is provided with a communicating valve, and the communicating valve is configured to be opened or closed to realize balance of the air pressures inside and outside the liquid-gas coexisting container or sealing of the liquid-gas coexisting container.

3. The compressed-air energy storage system according to claim 1, wherein liquid ports of the two or more liquid-gas coexisting containers are communicated by a hydraulic pipeline, the hydraulic pipeline is provided with a plurality of liquid pump assemblies and a plurality of liquid valves, the liquid pump assembly is arranged between each adjacent two liquid-gas coexisting containers, and the liquid valve is arranged at the liquid port of each liquid-gas coexisting container.

4. The compressed-air energy storage system according to claim 3, wherein the liquid pump assembly is configured to transfer the pressurized liquid in the at least one of the two or more liquid-gas coexisting containers to the liquid-gas coexisting container storing the high-pressure air, and comprises a liquid pump and a control valve connected with the liquid pump.

5. The compressed-air energy storage system according to claim 3, wherein the gas ports of the two or more liquid-gas coexisting containers are communicated by a pneumatic pipeline, the pneumatic pipeline is provided with a plurality of gas valves, and each gas valve is correspondingly arranged at the gas port of each liquid-gas coexisting container.

6. The compressed-air energy storage system according to claim 3, wherein the pressure balancing member and the gas port are both arranged at a top of the liquid-gas coexisting container, and the liquid port is arranged at a bottom of the liquid-gas coexisting container.

7. A compressed-air energy storage method, wherein the method adopts a compressed-air energy storage system, and the compressed-air energy storage system comprises:
- two or more liquid-gas coexisting containers, wherein at least one of the two or more liquid-gas coexisting containers is filled with a pressurized liquid, the rest liquid-gas coexisting containers are configured to store a high-pressure air, and the two or more liquid-gas coexisting containers are in communication with each other;
- a compressor unit connected to a gas port of each liquid-gas coexisting container and configured to introduce the high-pressure air into the liquid-gas coexisting container configured to store the high-pressure air; and
- an expander unit connected to the gas port of each liquid-gas coexisting container, to allow the high-pressure air stored in the liquid-gas coexisting container to be introduced into the expander unit to do work and generate electricity, wherein in an initial stage, the at least one of the two or more liquid-gas coexisting containers is filled with the pressurized liquid;

in an energy storage operating condition, the compressor unit compresses air to generate the high-pressure air and sends the high-pressure air into the rest liquid-gas coexisting containers; and in an energy release operating condition, the pressurized liquid in the at least one of the two or more liquid-gas coexisting containers is input into the liquid-gas coexisting container filled with the high-pressure air until the high-pressure air is completely displaced by the pressurized liquid in the liquid-gas coexisting container, and all the high-pressure air in the liquid-gas coexisting container enters the expander unit to expand and do work, wherein in the initial stage, one liquid-gas coexisting container is filled with the pressurized liquid;

in the energy release operating condition, the pressurized liquid in the liquid-gas coexisting container is input into an adjacent liquid-gas coexisting container filled with the high-pressure air until the high-pressure air is completely displaced by the pressurized liquid, and the high-pressure air in the liquid-gas coexisting container enters the expander unit to push the expander unit to do work.

* * * * *